July 13, 1937.  H. J. HAWKINS  2,087,146
WEIGHING SCALE
Filed July 21, 1936

Inventor
H. J. Hawkins
By L. F. Kendreth
Attorney

Patented July 13, 1937

2,087,146

UNITED STATES PATENT OFFICE 2,087,146

WEIGHING SCALE

Harold J. Hawkins, Hickman, Calif.

Application July 21, 1936, Serial No. 91,767

2 Claims. (Cl. 265—47)

This invention relates to a scale mechanism or balance and it particularly aims to provide a construction which will operate with minimum friction and wear of the parts.

More particularly it is aimed to provide a construction wherein the weight through the medium of a float, is translated to mercury which in turn actuates a registering mechanism.

The more specific objects and advantages will become apparent from a consideration of the description following taken in connection with accompanying drawing illustrating an operative embodiment.

In said drawing:—

Figure 1:
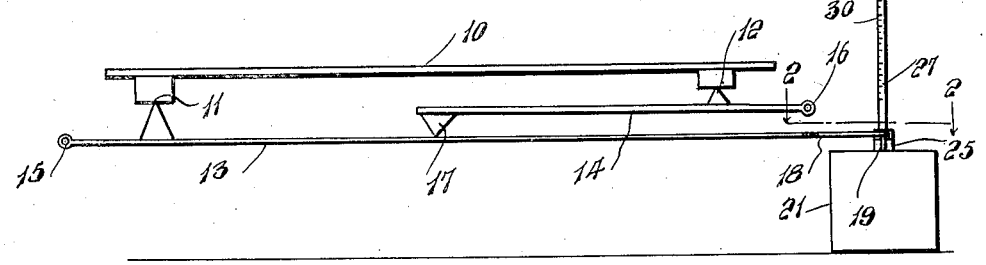
Figure 1 is a view of the scales in side elevation.
Figure 2:
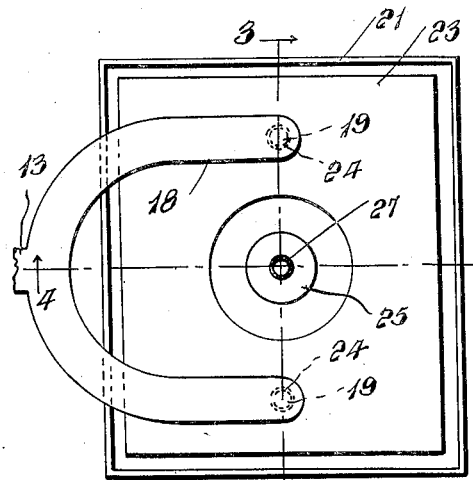
Figure 2 is a section taken on the line 2—2 of Figure 1.
Figure 3:
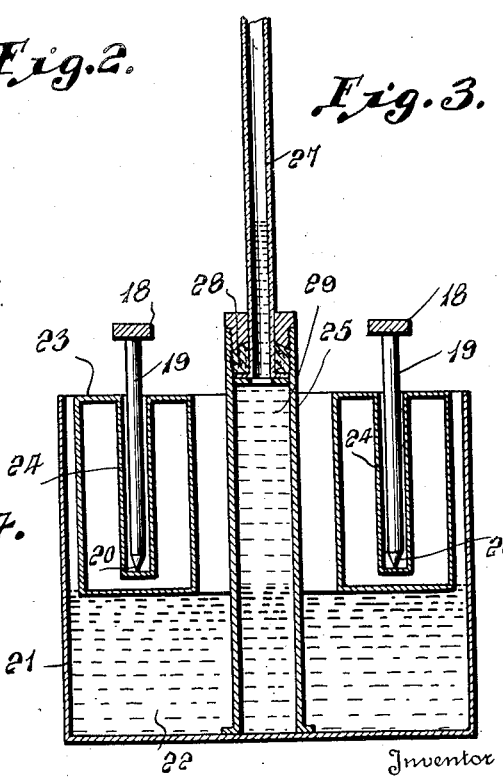
Figure 3 is a section taken on the line 3—3 of Figure 2.
Figure 4:
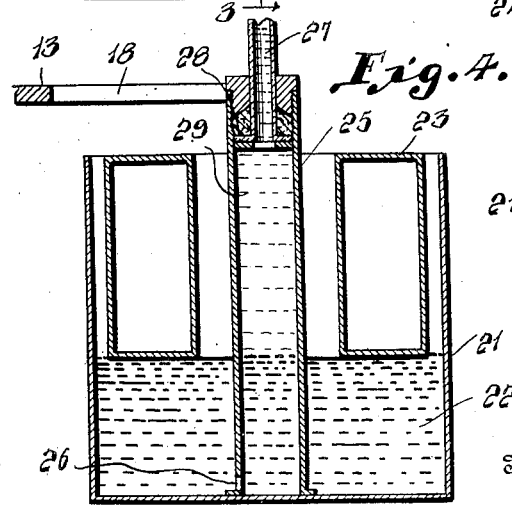
Figure 4 is a section taken on the line 4—4 of Figure 2.

Referring specifically to the drawing wherein like reference characters designate like or similar parts, a scale platform is shown at 10, poised or fulcrumed at 11 and 12, upon lever beams 13 and 14, respectively. The lever 13 is pivoted at one end as at 15 to a suitable support and the lever 14 at 16, is pivoted at one end to a suitable support, its other end carrying a fulcrum piece 17, with which the lever 13 contacts.

One end, namely the free end of the beam lever 13 is bifurcated or of U-shape as at 18 and depending from the arms thereof one adjacent each free end of each arm, are pegs 19 having their lower ends pointed as shown at 20.

A receptacle is shown at 21 adapted to contain mercury as at 22. A suitable float, preferably metallic, is shown at 23, engaging the surface of the mercury 22 and such float has wells 24 therein with the bottom of which the conical points 20 are adapted to contact. The pegs 19 are of substantially less cross sectional area as the space within the wells 24 so that the pegs fit the wells without freedom to move laterally therein.

A stand pipe 25 is secured in the receptacle 21 equidistantly between the pegs 19 and at the lower portion has an opening 26 so that the mercury may flow interiorly of the stand pipe. From the top of the stand pipe, an indicating tube 27 rises, such tube preferably being of glass and having its lower end portion as at 28, suitably secured water tight to the stand pipe. Within the stand pipe and a portion of the indicator tube 27, a body of liquid 29 is provided. Such liquid is of lighter specific gravity than the mercury and is adapted to rise in the tube 27 as the mercury is displaced through the depression of the float 23. Calibrations at 30 are provided on the tube 27, proportioned to the rise of the fluid 29, occasioned by the depression of the float, to indicate weight. It is clear that the fluid 29 may be colored, if desired.

In the use of the device, the material to be weighted is placed upon the platform 10 and in proportion to such weight, the platform reacts on the beam levers 14 and 13, causing the pegs 19 to descend, pushing the float 23 downwardly, displacing the mercury somewhat causing it to rise within the stand pipe and in turn to elevate the fluid 29 so as to properly coact with the calibrations 30 to indicate the weight.

Attention is called to the fact that the points of the pegs at 20 reduce friction and the location of the points applies the pressure of the lever beam to the float below the center of the float to insure equal submersion of both sides of the float relative to the mercury.

Various changes may be resorted to provided they fall within the spirit and scope of the invention.

I claim as my invention:—

1. Apparatus of the class described having a lever beam depressible by weight superposed thereon, said lever beam at its free end being bifurcated, pegs depending from the arms of the bifurcation, a container for mercury, a stand pipe in the receptacle open to the flow of mercury, a float surrounding said stand pipe and engaging the mercury, wells depending from the top of the float on opposite sides of the stand pipe, said pegs at their lower ends engaging the float below the center of the latter, an indicator tube leading from the stand pipe, and a liquid lighter than mercury operable by the latter to indicate in said tube.

2. Apparatus of the class described having a lever beam depressible by weight superposed thereon, said lever beam at its free end being bifurcated, pegs depending from the arms of the bifurcation, a container for mercury, a stand pipe in the receptacle open to the flow of mercury, a float surrounding said stand pipe and engaging the mercury, said pegs at their lower ends engaging the float below the center of the latter, an indicator tube leading from the stand pipe, and a liquid lighter than mercury operable by the latter to indicate in said tube, said float having wells depending from the top thereof in which the pegs extend, said pegs being of less diameter than the interior diameter of the wells, and said pegs having pointed lower ends engaging the base walls of the wells.

HAROLD J. HAWKINS.